(12) United States Patent
Fujikawa et al.

(10) Patent No.: US 8,264,395 B2
(45) Date of Patent: Sep. 11, 2012

(54) RADAR DEVICE AND RAIN/SNOW AREA DETECTING DEVICE

(75) Inventors: Takumi Fujikawa, Nishinomiya (JP); Tatsuya Kojima, Nishinomiya (JP)

(73) Assignee: Furuno Electric Company, Limited, Nishinomiya (JP)

(*) Notice: Subject to any disclaimer, the term of this patent is extended or adjusted under 35 U.S.C. 154(b) by 252 days.

(21) Appl. No.: 12/700,472

(22) Filed: Feb. 4, 2010

(65) Prior Publication Data

US 2010/0207809 A1    Aug. 19, 2010

(30) Foreign Application Priority Data

Feb. 6, 2009    (JP) ................................. 2009-026420

(51) Int. Cl.
*G01S 13/95* (2006.01)
(52) U.S. Cl. .................................... 342/26 R; 342/26 D
(58) Field of Classification Search ............... 342/26 R, 342/26 A–26 D
See application file for complete search history.

(56) References Cited

U.S. PATENT DOCUMENTS

| | | | | |
|---|---|---|---|---|
| 3,973,258 A * | 8/1976 | Cerni et al. | ................. | 342/26 R |
| 4,223,309 A * | 9/1980 | Payne | ......................... | 342/26 B |
| 4,334,223 A * | 6/1982 | Katagi | ........................ | 342/26 R |
| 4,728,952 A * | 3/1988 | Residois | ..................... | 342/26 D |
| 5,077,558 A * | 12/1991 | Kuntman | ..................... | 342/26 R |
| 5,438,334 A * | 8/1995 | Anderson | .................... | 342/26 D |
| 5,539,409 A * | 7/1996 | Mathews et al. | ............ | 342/26 B |
| 5,973,635 A * | 10/1999 | Albo | .............................. | 342/26 D |
| 6,061,013 A * | 5/2000 | Sauvageot et al. | .......... | 342/26 R |
| 6,097,329 A * | 8/2000 | Wakayama | ................. | 342/26 D |
| 6,201,494 B1 * | 3/2001 | Kronfeld | ..................... | 342/26 R |
| 6,456,227 B2 * | 9/2002 | Wada et al. | ................. | 342/26 R |
| 6,577,265 B2 * | 6/2003 | Dalton et al. | ............... | 342/26 R |
| 6,597,305 B2 * | 7/2003 | Szeto et al. | ................. | 342/26 R |
| 6,741,203 B1 * | 5/2004 | Woodell | ...................... | 342/26 B |
| 6,937,185 B1 | 8/2005 | Collazo et al. | | |
| 7,053,813 B1 * | 5/2006 | Hubbert et al. | ............ | 342/26 R |
| 7,109,913 B1 * | 9/2006 | Paramore et al. | ........... | 342/26 B |
| 7,307,576 B1 | 12/2007 | Koenigs | | |
| 7,515,088 B1 * | 4/2009 | Woodell et al. | ............ | 342/26 B |
| 7,633,428 B1 * | 12/2009 | McCusker et al. | .......... | 342/26 B |
| 7,843,378 B2 * | 11/2010 | Venkatachalam et al. | .. | 342/26 R |
| 2003/0025627 A1 * | 2/2003 | Wilson et al. | ................... | 342/26 |
| 2003/0025628 A1 * | 2/2003 | Katsuhiro | ....................... | 342/26 |
| 2004/0041725 A1 * | 3/2004 | Matsuda et al. | ............... | 342/26 |
| 2004/0201515 A1 * | 10/2004 | Testud et al. | ................. | 342/26 R |

(Continued)

FOREIGN PATENT DOCUMENTS

GB    2467641 A * 8/2010

(Continued)

*Primary Examiner* — John B Sotomayor
(74) *Attorney, Agent, or Firm* — Birch, Stewart, Kolasch & Birch, LLP (57) ABSTRACT

A radar device is disclosed. The radar device includes a radar antenna, from which detection signals are transmitted while the radar antenna being rotated, the radar device generating a radar image from reflection waves of the transmitted detection signals, a reception module for receiving the reflection waves of the detection signals, an inclination calculating module for calculating an inclination of level of the received signals that continue in a predetermined direction, the inclination being a rate of change in the received signal level per predetermined range in the predetermined direction, and a rain/snow reflection determining module for determining whether the received signals are reflection signals from at least one of rain and snow by using the inclination calculated by the inclination calculating module.

13 Claims, 9 Drawing Sheets

U.S. PATENT DOCUMENTS

| | | | |
|---|---|---|---|
| 2006/0097907 A1* | 5/2006 | Fischer et al. | 342/26 R |
| 2007/0222661 A1* | 9/2007 | Stagliano et al. | 342/26 R |
| 2007/0236383 A1* | 10/2007 | Makkapati et al. | 342/26 R |
| 2008/0291082 A1* | 11/2008 | Kemkemian | 342/26 B |
| 2009/0273510 A1* | 11/2009 | Tillotson | 342/26 B |
| 2010/0052978 A1* | 3/2010 | Tillotson | 342/26 B |

FOREIGN PATENT DOCUMENTS

| | | |
|---|---|---|
| JP | 3-163383 A | 7/1991 |
| JP | 11-352212 A | 12/1999 |
| JP | 2000-22874 A | 8/2000 |
| JP | 2001-174689 A | 8/2001 |

* cited by examiner

RADAR DEVICE AND RAIN/SNOW AREA DETECTING DEVICE

CROSS-REFERENCE TO RELATED APPLICATION(S)

This application claims priority under 35 U.S.C. §119 to Japanese Patent Application No. 2009-026420, which was filed on Feb. 6, 2009, the entire disclosure of which is hereby incorporated by reference.

TECHNICAL FIELD

The present invention relates to a radar device for detecting an occurring area of reflection signals from rain and/or snow (hereinafter, referred to as "rain/snow reflection signals"). The present invention also relates to a rain/snow area detecting device for detecting an occurring area of the rain/snow reflection signals.

BACKGROUND

Conventional radar devices typically use scan-to-scan correlation processing to remove unused signals, such as reflections from a sea surface (sea surface reflections), so that easy discrimination of the reflections from target objects is possible (for example, refer to JP 03-163383(A)). The scan-to-scan correlation processing includes comparing latest-acquired echo data with echo data for several scans of the past, and generating display data based on the temporal behavior of the echo data. As for the reflection signals from a target object, such as a vessel or land, they are highly stable so that their echo data appear in the same pixel; however, the sea surface reflection signals are less stable so that their echo data do not appear easily in the same pixel. Thus, the scan-to-scan correlation processing utilizes this difference to distinguish the reflection signals from the target object and the sea surface reflection signals.

Meanwhile, because an area where rain/snow reflection signals occur is usually relatively large and a moving speed of the occurring area is slow, the rain/snow reflection signals remain in the same pixels over a long period of time. Therefore, the rain/snow reflection signals are highly stable similar to the reflection signals from the target object so that their echo data appear continuously in the same pixels. For this reason, it is difficult for the conventional scan-to-scan correlation processing to display the rain/snow reflections which are unused images while suppressing them.

There exists FTC (First Time Constant) processing and CFAR (Constant False Alarm Rate) processing as techniques for suppressing the rain/snow reflection signals. These processing reduce the intensity of the rain/snow reflection signals; however, at the same time, they reduce the intensity of the reflection signals from a land which extends in the distance direction from the radar.

SUMMARY

The present invention solves the above-described situations, and provides a radar device and a rain/snow area detecting device for detecting an area where rain/snow reflection signals occur so that signals from a target object, such as a vessel or land, are distinguished from the rain/snow reflection signals to appropriately carry out processing for the occurring area of the rain/snow reflection signals.

According to an aspect of the invention, a radar device includes a radar antenna, from which detection signals are transmitted while the radar antenna being rotated, the radar device generating a radar image from reflection waves of the transmitted detection signals, a reception module for receiving the reflection waves of the detection signals, an inclination calculating module for calculating an inclination of level of the received signals that continue in a predetermined direction, the inclination being a rate of change in the received signal level per predetermined range in the predetermined direction, and a rain/snow reflection determining module for determining whether the received signals are reflection signals from at least one of rain and snow by using the inclination calculated by the inclination calculating module.

According to another aspect of the invention, a rain/snow area detecting device includes an acquisition module for acquiring received signals detected by a radar antenna, an inclination calculating module for calculating an inclination of level of the received signals that continue in a predetermined direction, the inclination being a rate of change in the received signal level per predetermined range in the predetermined direction, and a rain/snow reflection determining module for determining whether the received signals are reflection signals from at least one of rain and snow by using the inclination calculated by the inclination calculating module.

The aspects of the invention focus on that a rise and fall of the received signal level of the reflection signals from rain and/or snow (rain/snow reflection signals) are mild, compared with reflection signals from a target object, such as a vessel or land. Thus, the radar device measures an inclination of the rise of the received signal level, and detects whether the reflection signals are the rain/snow reflection signals base on the inclination angle. Alternatively, the radar device may detect a start position of an occurring area of the rain/snow reflection signals by using the rise of the received signal level, and after that, may detect an end position of the occurring area of the rain/snow reflection signals by using the fall of the received signal level.

Using the inclination which is the rate of change in the received signal level for discrimination of the rain/snow reflection signals may be advantageous in that there are less influences to the change in input signal level due to sensitivity adjustment, compared with a conventional method of identifying the rain/snow reflection signals by comparison of the signal level.

The determination of whether the received signals are the rain/snow reflection signals may use both the inclination calculated by the inclination calculating module and a change in the inclination. The change in the inclination may include a change of sign of the inclination value or a chorological change in the inclination value.

For example, the rain/snow reflection determining module may include a rain/snow determining counter that determines whether the inclination calculated by the inclination calculating module and the change in the inclination satisfy a predetermined condition every time the inclination is calculated by the inclination calculating module, and changes a count value of the rain/snow determining counter based on the determination result. The rain/snow reflection determining module may determine whether the received signals are the reflection signals from at least one of rain and snow based on the count value of the rain/snow determining counter.

In this case, it enables the rain/snow reflection determining module to derive a probability of whether the received signal is the rain/snow reflection signal based on the count value of the rain/snow determining counter.

The inclination calculating module may extract, from the received signals, received signals that continue in an antenna rotating direction substantially at the same distance, and may calculate the inclination based on the extracted received signals.

Usually, radar interferences due to the transmission from other radar devices are not inputted over adjacent signals in the antenna rotating direction. Therefore, by identifying the rain/snow reflection signals from the received signals that continue in the antenna rotating direction, the radar interference can be eliminated to more accurately determine whether the reflection signals are the rain/snow reflection signals.

STC (Sensitivity Time Control) processing for suppressing sea surface reflections is typically provided to perform the sensitivity adjustment of the received signal level according to a distance from the sweep center. Therefore, by identifying the rain/snow reflection signals using the received signals that continue in the antenna rotating direction, the received signals of substantially the same distance from the sweep center can be used. At the same time, it is possible to accurately determine whether the reflection signals are the rain/snow reflection signals without influences of the STC processing.

The radar device or the rain/snow area detecting device may include a low-pass filter in the earlier stage of the inclination calculating module, and the inclination calculating module may calculate the inclination angle of the received signal level using the smoothly-changing received signals which are low-pass filter outputs. If the inclination angle of the received signal level is calculated using received signals containing high frequency components, accuracy of the inclination calculated by the inclination calculating module may deteriorates; however, this problem can be solved by providing the low-pass filter in the earlier stage of the inclination calculating module.

Further, the received signals that continue in the antenna rotating direction substantially at the same distance can be easily applied with the low-pass filtering because the continuous received signals can be obtained over all directions without the series of data cut off. Typically, a conventional radar device receives reflection signals which continue in time series radially from the center toward the circumference by one transmission and reception of a signal, the received signals that continue in the distance direction do not have correlation at the most proximal (central) part and the most distant part to cause discontinuous points. If low-pass filtering is applied to the signals with such discontinuous points, a measure to the discontinuous points must be needed. However, the received signals that continue in the antenna rotating direction substantially at the same distance do not need such a measure to the discontinuous points.

According to the aspects of the invention, because they can be determined whether received signals are rain/snow reflection signals, they are possible to display an area where the rain/snow reflections occur on a display screen, as well as to suppress the rain/snow reflection signals in a radar image displayed on the display screen.

According to another aspect of the invention, a method of detecting a rain/snow area includes acquiring received signals detected by a radar, calculating an inclination of level of the received signals that continue in a predetermined direction, the inclination being a rate of change in the received signal level per predetermined range in the predetermined direction, and determining whether the received signals are reflection signals from at least one of rain and snow by using the calculated inclination.

BRIEF DESCRIPTION OF THE DRAWINGS

The present disclosure is illustrated by way of example and not by way of limitation in the figures of the accompanying drawings in which the like reference numerals display like elements and in which.

DETAILED DESCRIPTION

Hereinafter, an embodiment of the present invention will be described of a radar device referring to the appended drawings. Note that, although in the following embodiment sea application is particularly described for the radar device, other water application such as for river and lake may also be possible. Further, the radar device may be equipped on any type of water vessels other than ships as described in this embodiment. Further, the radar device may also be implemented in applications, including land application, mobile application, and/or monitoring or surveillance application.

Figure 1:
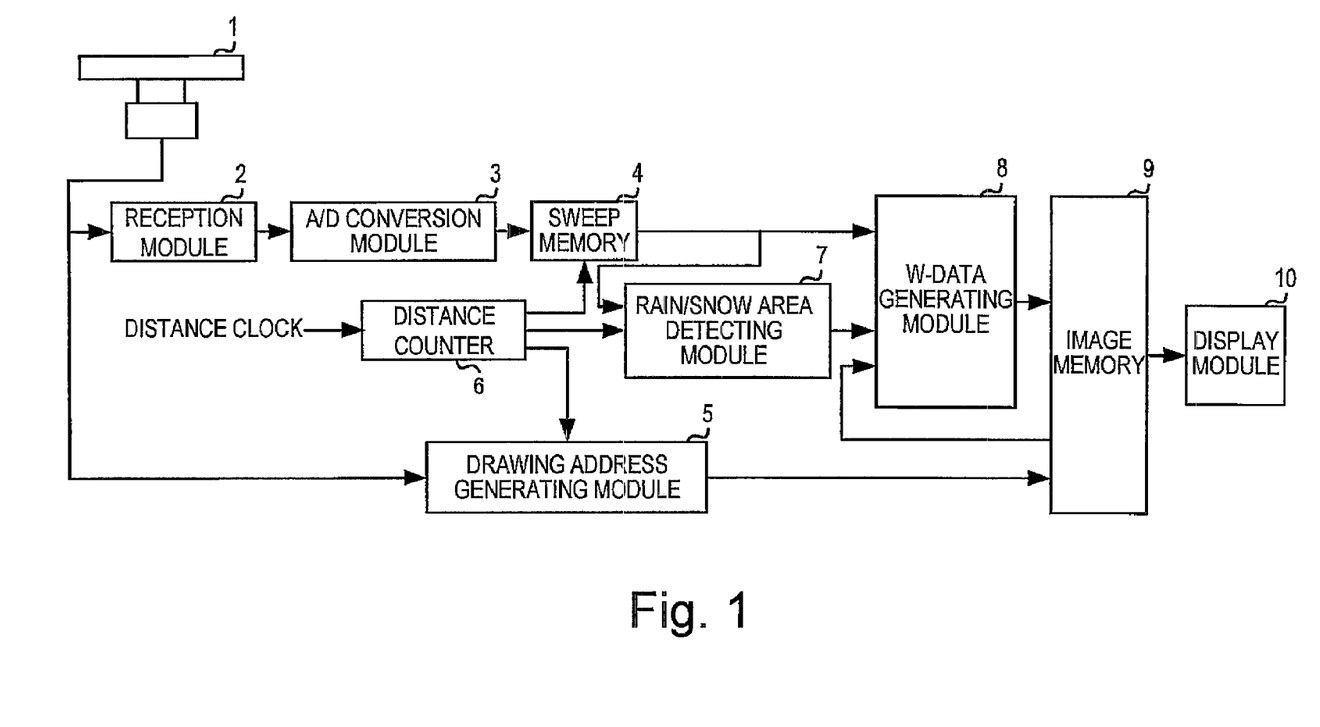
FIG. 1 is a schematic block diagram showing a configuration of a radar device according to an embodiment of the present invention.

FIG. 1 is a schematic block diagram showing a configuration of the radar device according to this embodiment.

A radar antenna 1 rotates (sweeps) horizontally at a predetermined rotation speed (cycle). While rotating, the antenna 1 transmits detection signals which are pulse-shaped electric waves at a cycle different from the rotation cycle, and receives reflection waves caused by the transmitted detection signals.

A reception module 2 detects and amplifies the received signals acquired by the radar antenna 1, and then outputs them to an A/D conversion module 3. The A/D conversion module 3 converts the analog signals acquired by the reception module 2 into digital signals each containing two or more bits.

A sweep memory 4 is a buffer for storing in real time the A/D-converted received signals for one sweep of the antenna, and writes the received signals Xn for one sweep in an image memory 9 described later by the time the received signals to be acquired for the next transmission overwrites.

A drawing address generating module 5 uses the center of the sweep as its start address. Based on a sweep angle of the antenna with respect to a predetermined direction (for example, the bow direction of a ship that equips the radar device) and a read-out position of the sweep memory 4, the drawing address generating module 5 creates an address which specifies a pixel of the image memory 9 where pixels are arranged in a corresponding rectangular coordinate system. The drawing address generating module 5 includes a hardware that implements the following Equations 1 and 2.

$$X = Xs + r \cdot \sin\theta \quad (1)$$

$$Y = Y_s + r \cdot \cos\theta \quad (2)$$

Here,

X, Y: address components which specify a pixel of the image memory 9;

Xs, Ys: address components specifying the center of sweep (start address);

r: a distance from the sweep starting point; and

θ: a sweep angle with respect to the predetermined direction.

A distance counter 6 is reset at the sweep starting point and increments its count value r for every distance clock given. Therefore, the count value r corresponds to the distance from the sweep starting point.

A rain/snow area detecting module 7 determines whether or not the received signals inputted from the sweep memory 4 are rain/snow reflection signals, and detects an area where the rain/snow reflection signals occur based on the determination. In this embodiment, the determination of which the received signals are the rain/snow reflection signals is performed based on an inclination of the level of the received signals that continue in a predetermined direction (sweep direction is used in this embodiment). More specifically, the inclination is defined by a rate of change in the received signal level per a predetermined unit number of the levels (that is, within a predetermined range in the predetermined direction).

Figure 2:
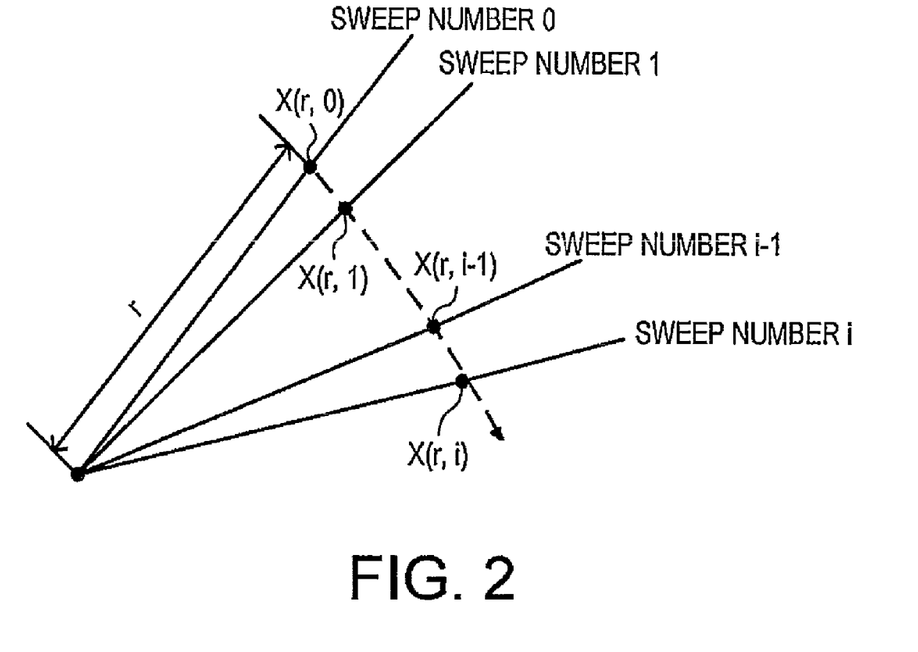
FIG. 2 is a diagram illustrating a relation between a distance of an input signal and a sweep number.

Hereinafter, the determination by the rain/snow area detecting module 7 of whether or not the received signals are the rain/snow reflection signals based on the received signals that continue in the sweep direction will be described as an example. Note that, in this embodiment, the received signals that continue in the sweep direction are the received signals having the same count value of the distance counter 6. For example, the signals may be X(r, 0), X(r, 1), ..., X(r, i−1), and X(r, i) as shown in FIG. 2. Thus, the received signals that continue in the sweep direction are read out from the sweep memory 4 the based on the count value of the distance counter 6.

Figure 3:
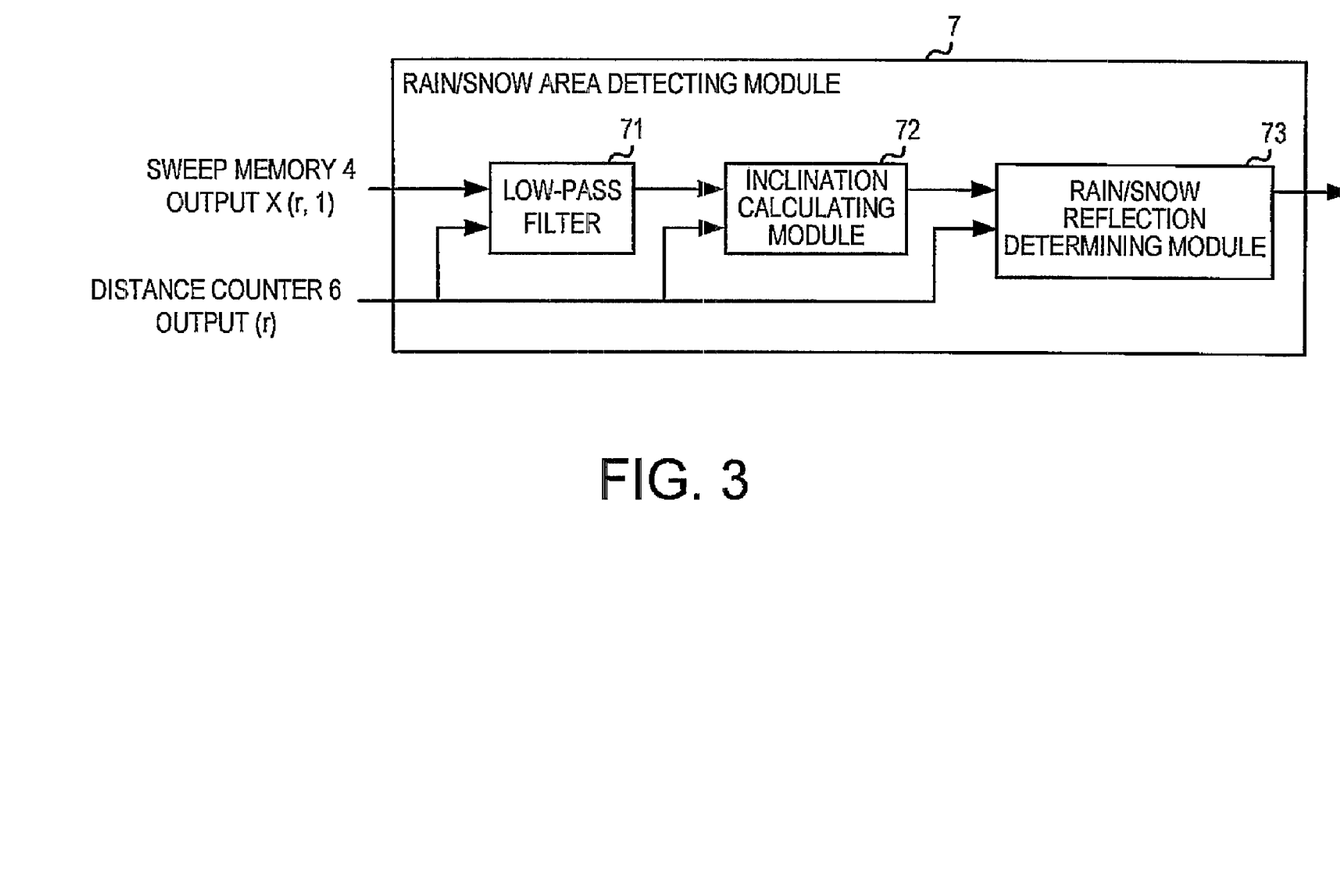
FIG. 3 is a schematic block diagram showing a configuration of a rain/snow area detecting module of the radar device shown in FIG. 1.
Figure 4:
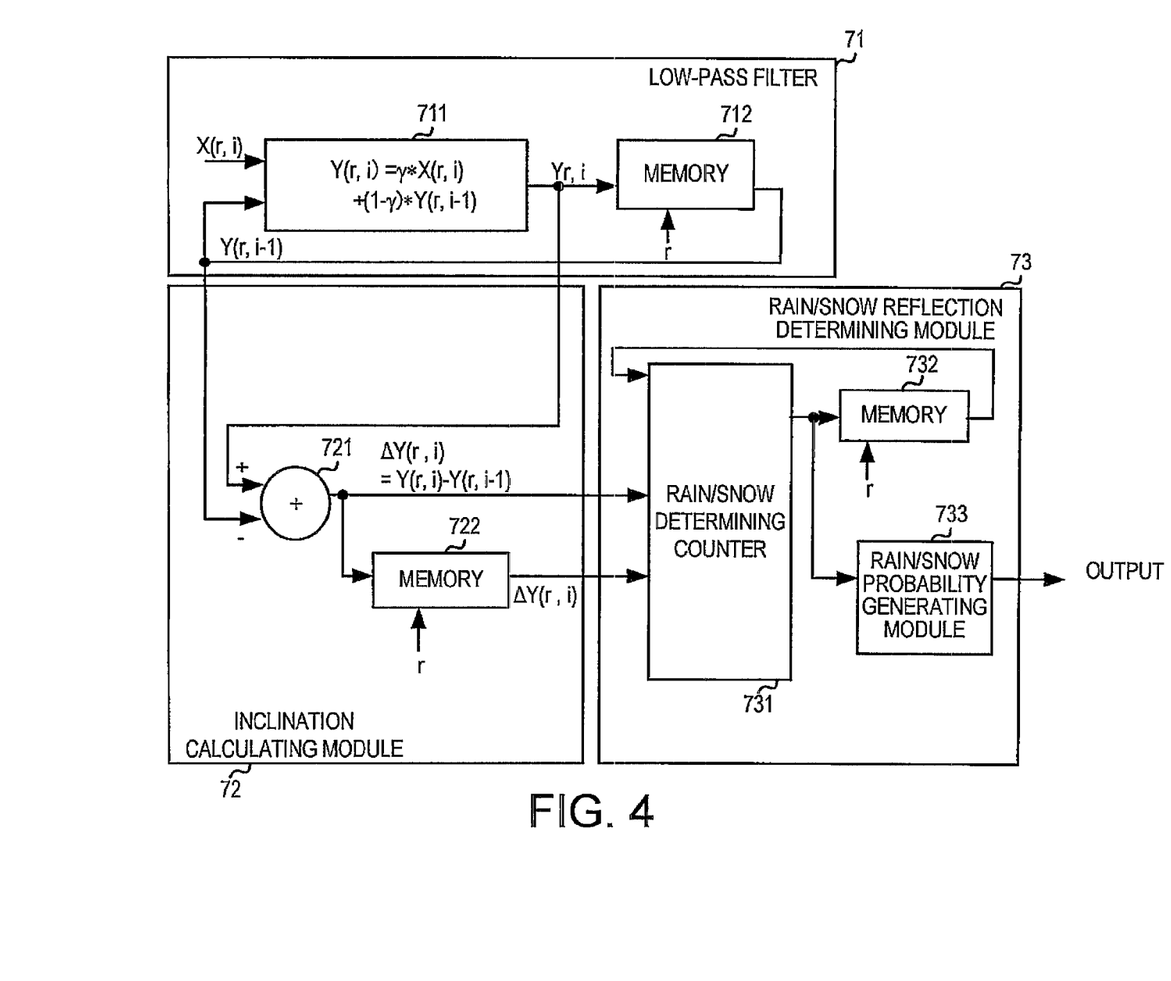
FIG. 4 is a schematic block diagram showing a configuration of the rain/snow area detecting module of the radar device shown in FIG. 3 in more detail.
Figure 5:
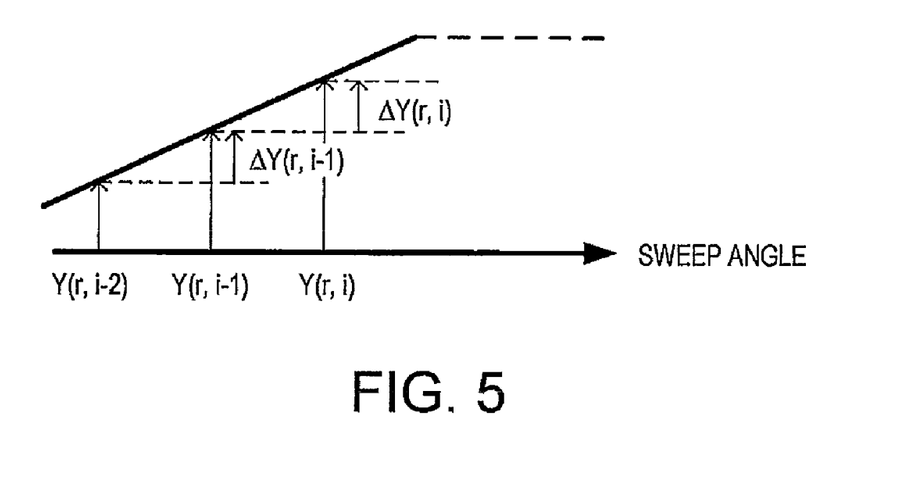
FIG. 5 is a graph for illustrating an operation of an inclination calculating module of the radar device shown in FIG. 1.

FIG. 3 is a schematic block diagram showing a configuration of the rain/snow area detecting module 7 of the radar device according to this embodiment. FIG. 4 is a schematic block diagram illustrating the configuration of the rain/snow area detecting module 7 in more detail.

The rain/snow area detecting module 7 includes a low-pass filter 71, an inclination calculating module 72, and a rain/snow reflection determining module 73. The low pass filter 71 suppresses a rapid change in the received signal level so that the received signal level of the received signals that continue in the sweep direction smoothly changes. The low pass filter 71 includes a calculating module 711 and a low-pass filter memory 712. In this embodiment, the low-pass filter 71 is an IIR (Infinite Impulse Response) filter.

The calculating module 711 obtains an output Y(r, i) by adding the following two values together. One value is obtained by multiplying the input value X(r, i) read out from the sweep memory 4 by a coefficient γ. The other value is obtained by multiplying a filter output value Y for a previous sweep rotation (r, i−1) read out from the sweep memory 4 by a coefficient (1−γ). Equation 3 indicates the calculation of the calculating module 711.

$$Y(r,i) = \gamma \cdot X(r,i) + (1-\gamma) \cdot Y(r,i-1) \quad (3)$$

Here, r: the distance from the sweep center;

i: a sweep number; and

γ: a filter coefficient (0<γ<1).

The low-pass filter memory 712 stores the filtering results, and specifies an address by the output r of the distance counter

6. The filtering results stored in the low-pass filter memory 712 are used by the inclination calculating module 72 described later in detail.

The inclination calculating module 72 includes an adder 721 and an inclination calculating module memory 722. The inclination calculating module 72 derives a difference ΔY(r, i) between the current low-pass filter output Y(r, i) and the previous low-pass filter output Y(r, i−1). Because the signals outputted from the low-pass filter 71 are sampled at equal azimuth intervals, the difference is proportional to the inclination angle. Therefore, the obtained difference ΔY(r, i) can be used as the inclination angle of the level of the received signals that continue in the sweep direction. The following equation indicates the calculation of the adder 721.

$$\Delta Y(r,i) = Y(r,i) - Y(r,i-1) \quad (4)$$

Here,

ΔY(r, i): the inclination of the received signal level;

Y(r, i): the current low-pass filter output; and

Y(r, i−1): the previous low-pass filter output.

The inclination calculating module memory 722 stores the calculated inclination angles and specifies an address with the output r of the distance counter 6 in this memory. The inclination angles stored in the inclination calculating module memory 722 are used for calculation of a rate of increase in the inclination by the rain/snow reflection determining module 73 described later in detail.

The rain/snow reflection determining module 73 determines whether the received signals are the rain/snow reflection signals using the inclination calculated by the inclination calculating module 72. In this embodiment, the rain/snow reflection determining module 73 includes a rain/snow determining counter 731, a rain/snow reflection determining module memory 732, and a rain/snow probability generating module 733. The rain/snow reflection determining module 73 calculates the probability that the received signal X is a rain/snow reflection signal based on the count value of the rain/snow determining counter 731.

The rain/snow determining counter 731 constitutes a counter using the rain/snow reflection determining module memory 732, for specifying an address in this memory with the output r of the distance counter 6. This counter is incremented when "a rise of the rain/snow reflection signal" is detected, and when "a fall of the rain/snow reflection signal" is detected, the counter is decremented by a value which is equal to or greater than zero, and otherwise, the count value is held unchanged.

The detection condition of "the rise of the rain/snow reflection signal" is considered herein as the case where the following Conditions (1) and (2) are satisfied simultaneously. Condition (1) is when the inclination ΔY(r, i) of the received signal level is a positive value and below a predetermined value "a." That is, $$0 < \Delta Y(r,i) < a$$

Here, "a" is a threshold for excluding a rapid rise which appears in the reflection signals from the target object, and is set based on the inclination ΔY(r, i) of the received signal levels given during the rising part of the rain/snow reflection signals.

In order to exclude a tiny change in the output of the low-pass filter 71 which cannot be considered as a rise of the received signal level, a lower limit of the inclination of the received signal level may be set to a value slightly greater than zero, instead of zero.

Condition (2) is when the rate of increase in the inclination of the received signal level is a positive value. That is, $$0 < \Delta Y(r,i) - \Delta Y(r,i-1)$$

In order to exclude the tiny change which cannot be considered that the inclination of the received signal level changed, Condition (2) may be determined to be satisfied only when the rate of increase in the inclination of the received signal level is greater than a predetermined value.

The detection condition of "the fall of the rain/snow reflection signals" is considered as the case where the following Conditions (3) and (4) are satisfied simultaneously. Conditions (3) is when the inclination $\Delta Y(r, i)$ of the received signal level is a negative value, and is greater than predetermined value "b". That is, $$b < \Delta Y(r,i) < 0$$

Here, "b" is a threshold for excluding a rapid fall which appears in the reflection signals from the target object, and is set based on the inclination $\Delta Y(r, i)$ of the received signal levels given by the falling part of the rain/snow reflection signals.

In order to exclude the tiny change in the output of the low-pass filter 71 which cannot be considered as the fall of the received signal levels, an upper limit of the inclination of the received signal level may be set to a value slightly less than zero, instead of zero.

Condition (4) is when the rate of increase in the inclination of the received signal level is positive. That is, $$0 < \Delta Y(r,i) - \Delta Y(r,i-1)$$

In order to exclude the tiny change which cannot be considered that the inclination of the received signal level changed, it may be determined that the Condition (4) is satisfied only when the rate of increase in the inclination of the received signal level is greater than a predetermined value.

The rain/snow probability generating module 733 generates a rain/snow reflection probability based on the count value of the rain/snow determining counter 731, and then outputs it to the next module. The rain/snow reflection probability to be outputted from the rain/snow probability generating module 733 can be generated as shown in Table 1, for example. In Table 1, S, M, and L are determination thresholds for the count value to determine the rain/snow reflection probability, and are 0<S<M<L.

TABLE 1

| Rain/snow reflection probability $\delta$ = 0% | S $\geq$ count value |
|---|---|
| Rain/snow reflection probability $\delta$ = 30% | S < count value $\leq$ M |
| Rain/snow reflection probability $\delta$ = 70% | M < count value $\leq$ L |
| Rain/snow reflection probability $\delta$ = 100% | L < count value |

Hereinbelow, examples of the determination by the rain/snow reflection determining module 73 is described referring to FIGS. 6 and 7. Here, if the condition described above is satisfied, it is indicated by "O" and otherwise indicated by "X" in the figures.

Figure 6:
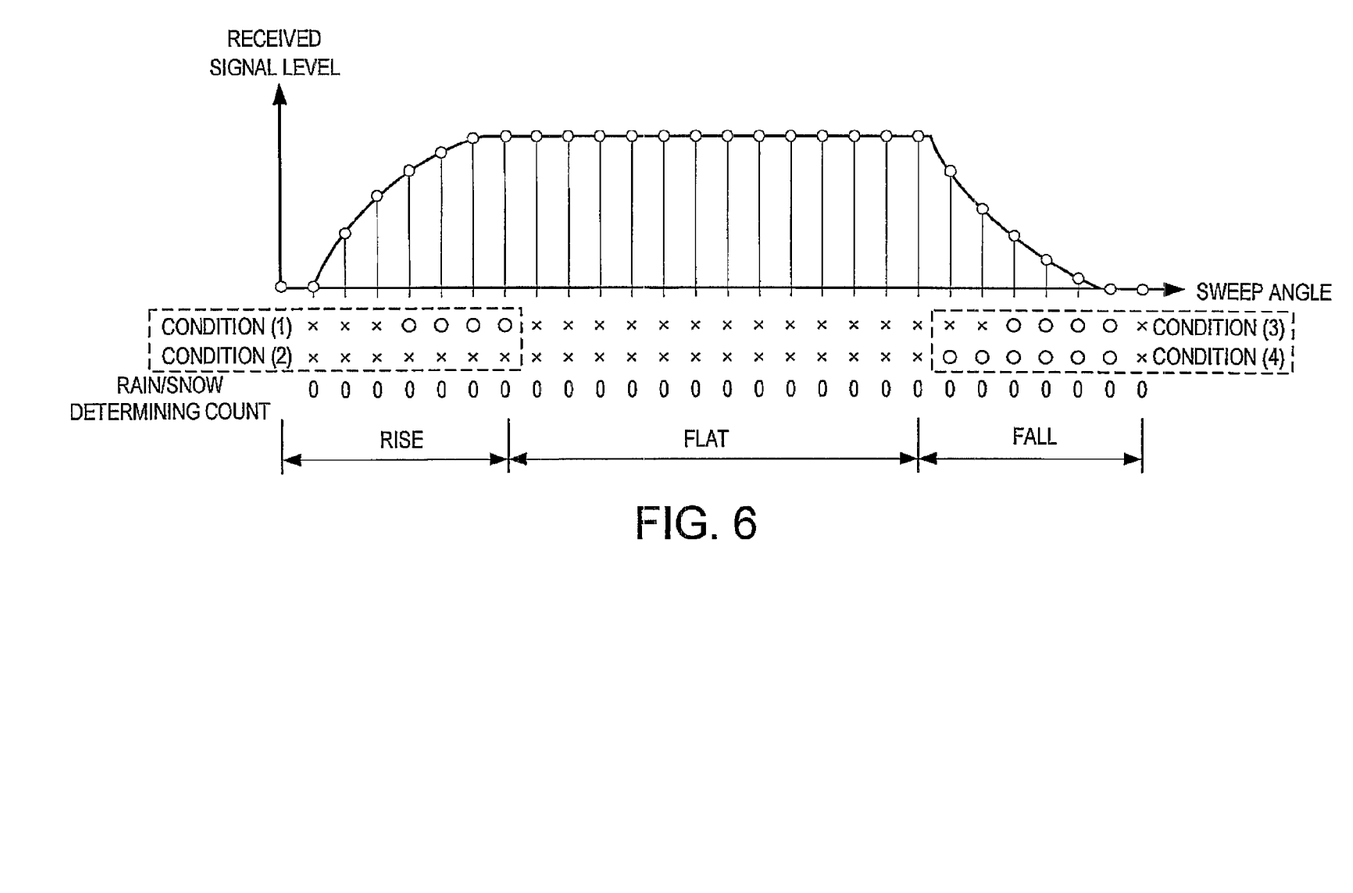
FIG. 6 is a graph for illustrating processing of a rain/snow reflection determining module for reflection signals from land.

FIG. 6 is a graph illustrating processing of the reflection signals from land by the rain/snow reflection determining module 73. As shown in FIG. 6, the reflection signals from land become stable at a predetermined level after their level rises steeply, and then fall steeply. Hereinbelow, the behavior of the received signal level is described by applying to the cases of Conditions (1) to (4). Note that the received signals shown in FIG. 6 indicate output signals from the IIR (Infinite impulse response) low-pass filter 71.

First, the rise of the received signal level of the reflection signals from land is described.

Condition (1) is satisfied when the inclination $\Delta Y(r, i)$ of the received signal level is a positive value and is less than a predetermined value "a", as described above. That is, during the rise of the received signal level shown in FIG. 6, the inclination of the received signal level outputted from the inclination calculating module 72 is a positive value at first; however, because the inclination is greater than the predetermined value "a," Condition (1) is not satisfied. Then, the inclination angle becomes less gradually and it will satisfy Condition (1).

Condition (2) is satisfied when the rate of increase in the inclination of the received signal level is a positive value. However, during the rise of the received signal level shown in FIG. 6, because the rate of increase in the inclination of the received signal level is negative, the received signals do not satisfy Condition (2).

Therefore, Conditions (1) and (2) are not satisfied simultaneously and, thus, the count value of the rain/snow determining counter 731 remains at zero without being incremented.

Next, an area where the received signal level of the reflection signals from land is flat is described. Because the inclination of the received signal level is zero in the flat part as shown in FIG. 6, any of Conditions (1) to (4) is not satisfied. Therefore, the count value of the rain/snow determining counter 731 remains at zero.

Finally, fall of the received signal level of the reflection signals from land is described.

Conditions (3) is satisfied when the inclination $\Delta Y(r, i)$ of the received signal level is a negative value and is greater than a predetermined value "b", as described above. During the fall of the received signal level shown in FIG. 6, the inclination of the received signal level outputted from the inclination calculating module 72 is a negative value at first; however, because the inclination is less than the predetermined value "b," Condition (3) is not satisfied. Then, the inclination angle becomes greater gradually and it will satisfy Condition (3).

Conditions (4) is satisfied when the rate of increase in the inclination of the received signal level is a positive value similar to Condition (2). Therefore, Condition (4) will be satisfied during the entire fall of the received signal level.

However, because the count value of the rain/snow determining counter 731 is already zero, the count value remains at zero without being decremented even when Conditions (3) and (4) are satisfied simultaneously.

As described above, the count value of the rain/snow determining counter 731 is fixed unchanged at zero for the reflection signals from land as shown in FIG. 6. Therefore, if the determination thresholds of the rain/snow probability generating module 733 shown in Table 1 are set to S=1, M=2, and L=3, for example, the reflection signals from the land shown in FIG. 6 are determined to be 0% in the rain/snow reflection probability.

Figure 7:
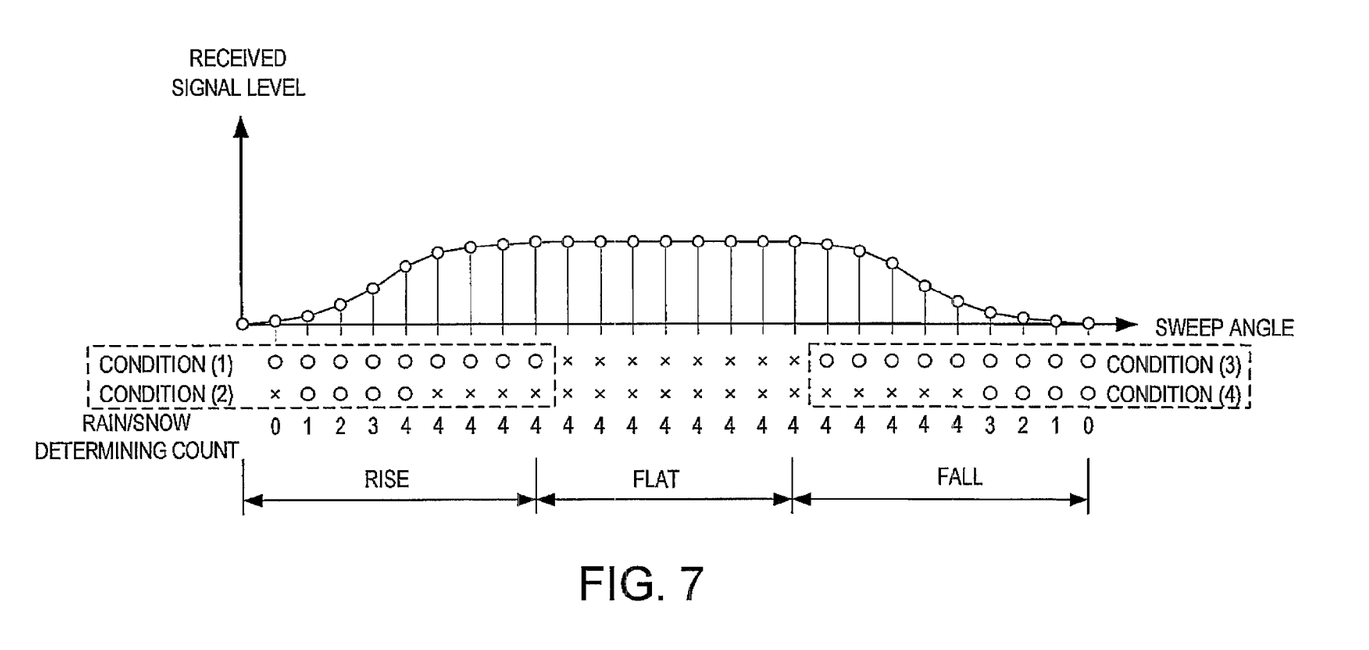
FIG. 7 is a graph for illustrating processing of the rain/snow reflection determining module for rain/snow reflection signals.

FIG. 7 is a graph illustrating processing of the rain/snow reflection signals by the rain/snow reflection determining module. As shown in FIG. 7, as for the rain/snow reflection signals, the received signal level rises mildly and is then stabilized at a predetermined level, and after that, it falls mildly. Hereinbelow, the behavior of the received signal level is described by applying to the cases of Conditions (1) to (4). The received signals shown in FIG. 7 indicate the output signals from the IIR low-pass filter 71.

First, the rise of the received signal level of the rain/snow reflection signals is described.

Condition (1) is satisfied when the inclination $\Delta Y(r, i)$ of the received signal level is a positive value and is less than a predetermined value "a", as described above. During the rise of the received signal level shown in FIG. 7, because the inclination of the received signal level outputted from the inclination calculating module 72 is a positive value and the value of the inclination is less than the predetermined value "a", it satisfies Condition (1).

Condition (2) is satisfied when the rate of increase in the inclination of the received signal level is a positive value. During the rise of the received signal level shown in FIG. 7, at first, the rate of increase in the inclination of the received signal level is positive and it thus satisfies Condition (2). However, the rate of increase in the inclination of the received signal level decreases gradually, and it then no longer satisfies Condition (2).

Therefore, the count value of the rain/snow determining counter 731 is incremented when Conditions (1) and (2) are satisfied simultaneously, and after that, the count value is maintained at the incremented value.

Next, an area where the received signal level of the rain/snow reflection signals is flat is described. Because the inclination of the received signal level is zero in the flat part as shown in FIG. 7, none of Conditions (1) to (4) is satisfied. Therefore, the count value of the rain/snow determining counter 731 maintains the count value incremented during the rise of the received signal level.

Finally, the fall of the received signal level of the rain/snow reflection signals is described.

Condition (3) is satisfied when the inclination $\Delta Y(r, i)$ of the received signal level is a negative value and is greater than a predetermined value "b", as described above. During the fall of the received signal level shown in FIG. 7, because the inclination of the received signal level outputted from the inclination calculating module 72 is a negative value and the value of the inclination becomes greater than the predetermined value "b", it satisfies Condition (3).

Similar to Condition (2), Condition (4) is satisfied when the rate of increase in the inclination of the received signal level is a positive value (i.e., a rate of decrease is a negative value). During the fall of the received signal level shown in FIG. 7, at first, because the rate of increase in the inclination of the received signal level is negative and it does not satisfy Condition (4). However, the rate of increase in the inclination of the received signal level then increases gradually, and it will satisfy Condition (4).

Therefore, the count value of the rain/snow determining counter 731 is decremented from the count value incremented during the rise of the received signal level when Conditions (3) and (4) are satisfied simultaneously.

As described above, as shown in FIG. 7, the count value of the rain/snow determining counter 731 is incremented from 0 to 4 during the rising part of the rain/snow reflection signals, and after that, the count value is held during the flat part and is then decremented from 4 to 0 during the falling part. If the determination thresholds of the rain/snow probability generating module 733 shown in Table 1 are set to S=1, M=2, and L=3, for example, as for the rain/snow reflection signals shown in FIG. 7, the received signal data at the first three points are determined to be 0% in the rain/snow reflection probability. After that, the rain/snow reflection probability increases gradually to 30%, 70%, and then to 100%, and the rain/snow reflection probability is then maintained at 100% for a predetermined period of time. After that, the rain/snow reflection probability will decrease gradually from 100% to 70%, 30%, and 0% during the falling part.

Figure 8:
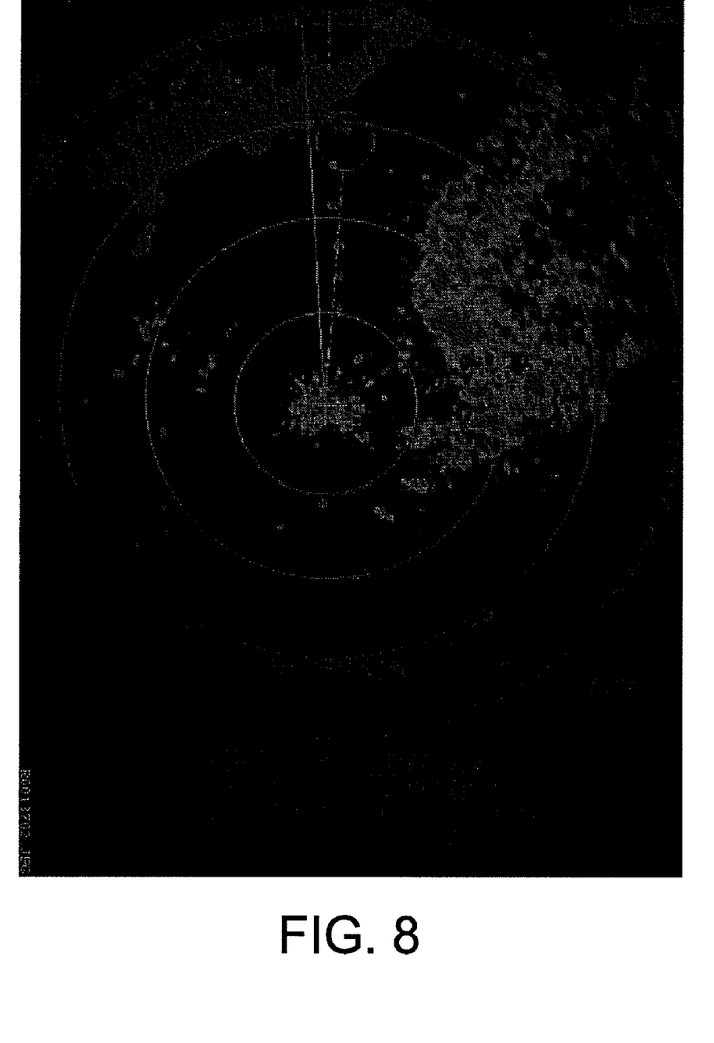
FIG. 8 is an example of a radar image which indicates received signals corresponding to the level of the received signals.
Figure 9:
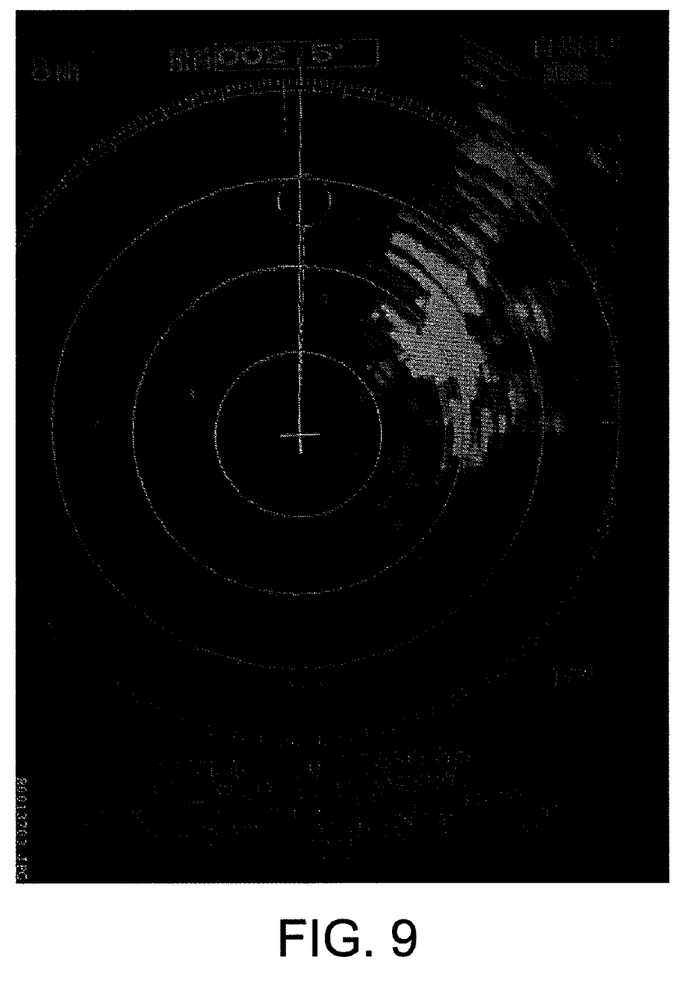
FIG. 9 is an example of a radar image for showing the rain/snow area detected by the rain/snow area detecting module.

FIG. 8 is a display example of actually received signals corresponding to the received signal levels. FIG. 9 is a display example of the rain/snow area detected by the rain/snow area detecting module 7, corresponding to the rain/snow reflection probabilities.

As shown in FIG. 8, the reflection signals from land are displayed on the upper left part of the radar image, and the reflection signals from rain are displayed on the right part of the radar image. The radar image is processed by the rain/snow area detecting module 7 of this embodiment as described above, and the processed result is shown in FIG. 9. As shown in FIG. 9, the reflection signals from the land which have been seen in the upper left part of the previous radar image are not detected as a rain/snow reflection area; however, the reflection signals from the rain seen in the right part of the radar image is appropriately determined to be a rain/snow reflection area. Thus, the reflection signals from land are distinguished from the reflection signals from rain (the same can be said for snow).

Referring back to FIG. 1, a W-data generating module 8 calculates current scan-to-scan correlation processing result Yn (of the current sweep rotation of the radar antenna) based on current received signals Xn inputted from the sweep memory 4, scan-to-scan correlation processing result Yn−1 of the previous sweep rotation (just one sweep rotation before the current) read out from the image memory 9, and rain/snow reflection probabilities δ outputted from the rain/snow area detecting module 7.

Specifically, the W-data generating module 8 performs calculation of the following Equation 5. Note that it is possible to distinguishingly display the reflection signals from the target object, such as a vessel or land, and the sea surface reflection signals by appropriately setting the values of α and β to suppress the level of the sea surface reflection signals.

$$Yn=(1-\delta)\cdot\alpha\cdot Xn+\beta\cdot Yn-1 \qquad (5)$$

Here,
$\alpha+\beta=1$,
$0\leq\alpha\leq 1$,
$0\leq\beta\leq 1$, and
$0\leq\delta\leq 1$.
Here,
δ: Rain/snow reflection probability; and
n: Scanning number.

The W-data generating module 8 uses the rain/snow reflection probabilities as one of the coefficients of the scan-to-scan correlation processing as shown in Equation 5 above. Thus, values less than actual input values can be outputted for greater rain/snow reflection probabilities, and thereby, the suppression of the rain/snow reflection signals corresponding to the rain/snow reflection probabilities can be performed.

If the received signal is other than the rain/snow reflection signal, the rain/snow reflection probability is outputted as an actual input value, which is zero. Thereby, the received signals other than the rain/snow reflection signals will be more emphasized as compared with the rain/snow reflection signals when they are displayed. Further, in this embodiment, the scan-to-scan correlation processing result Yn−1 of the previous sweep rotation are outputted as the actual input values even when the actual input values become zero during the next sweep rotation. Therefore, it can prevent the calculation results of Yn from suddenly becoming zero, and enables to display echoes as residual images during the next sweep rotation. As a result, the brightness difference between the rain/snow reflection signals and other reflection signals becomes greater in the display image, and thereby they are easy to be distinguished from each other.

Further, in this embodiment, the rain/snow determining counter 731 is provided to the rain/snow reflection determining module 73 to gradually increase and decrease the rain/snow reflection probability. Therefore, the level of the received signals displayed on the display screen can be changed continuously without causing extreme changes in the processing around the boundary part of the area where the rain/snow reflection signals occur and, thus, it is possible to obtain a more natural image for viewers.

The image memory 9 has a capacity for storing the received data for one antenna sweep rotation, and is used as a memory for display as well as for the scan-to-scan correlation processing. A display module 10 is raster-scanned by a display control module (not illustrated) and the image memory is read at a high speed synchronizing with the raster scan to display the read data as an image on the display module 10 by the brightness or color corresponding to the data. Although the image memory 9 serves as the display memory as well as the memory for the scan-to-scan correlation processing in this embodiment, an additional display memory may be provided so that the data is transferred from the memory for scan-to-scan correlation processing to the display memory to be used for the display image.

As described above, the rain/snow area detecting module 7 is provided to detect the area where the rain/snow reflection signals occur to distinguish the signals from the target object, such as a vessel or land, and the rain/snow reflection signals. Therefore, it is possible to display the area where the rain/snow reflection signals occur on the display screen, as well as to perform the suppression processing of the rain/snow reflection signals based on the information on the area where the rain/snow reflection signals occur.

In the above-described embodiment, an example in which the rain/snow reflection signals are suppressed by using the information on that the received signal is a rain/snow reflection signal as the coefficient of the scan-to-scan correlation processing. However, the application of the information on that the received signal is a rain/snow reflection signal may not be limited to this. For example, the rain/snow reflection signals may be suppressed by changing the processing, such as between FTC processing and CFAR processing, for the inside and outside of the area where the rain/snow reflection signals occur.

Further, in the above-described embodiment, an example in which the received signal is determined to be a rain/snow reflection signal by using the received signals that continue in the sweep direction. However, the rain/snow area detecting module 7 may determine that the received signal is a rain/snow reflection signal by using received signals that continue in a distance direction or any other direction, or a combination thereof, other than the received signals that continue in the sweep direction.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual relationship or order between such entities or actions. The terms "comprises," "comprise," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "approximately" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A radar device, comprising:
a radar antenna, from which detection signals are transmitted while the radar antenna being rotated, the radar device generating a radar image from reflection waves of the transmitted detection signals;
a reception module for receiving the reflection waves of the detection signals;
an inclination calculating module for calculating an inclination of magnitude of the received signals that continue in a predetermined direction, the inclination being a rate of change in the received signal magnitude per predetermined range in the predetermined direction; and
a rain/snow reflection determining module for determining whether the received signals are reflection signals from at least one of rain and snow by using the inclination calculated by the inclination calculating module.

2. The radar device of claim 1, wherein the rain/snow reflection determining module determines whether the received signals are the reflection signals from at least one of rain and snow based on the inclination calculated by the inclination calculating module and a change in the inclination.

3. The radar device of claim 2, wherein the rain/snow reflection determining module includes a rain/snow determining counter that determines whether the inclination calculated by the inclination calculating module and the change in the inclination satisfy a predetermined condition every time the inclination is calculated by the inclination calculating module, and changes a count value of the rain/snow determining counter based on the determination result; and
the rain/snow reflection determining module determines whether the received signals are the reflection signals from at least one of rain and snow based on the count value of the rain/snow determining counter.

4. The radar device of claim 1, wherein the inclination calculating module extracts, from the received signals, received signals that continue in an antenna rotating direction substantially at the same distance, and calculates the inclination based on the extracted received signals.

5. The radar device of claim 1, wherein the inclination calculating module uses low-pass filtered received signals.

6. The radar device of claim 2, wherein the change in the inclination includes a change of sign of the inclination value.

7. The radar device of claim 2, wherein the change in the inclination includes a chorological change in the inclination value.

8. A rain/snow area detecting device, comprising:
   an acquisition module for acquiring received signals detected by a radar;
   an inclination calculating module for calculating an inclination of magnitude of the received signals that continue in a predetermined direction, the inclination being a rate of change in the received signal magnitude per predetermined range in the predetermined direction; and
   a rain/snow reflection determining module for determining whether the received signals are reflection signals from at least one of rain and snow by using the inclination calculated by the inclination calculating module.

9. The rain/snow area detecting device of claim 8, wherein the rain/snow reflection determining module determines whether the received signals are the reflection signals from at least one of rain and snow based on the inclination calculated by the inclination calculating module and a change in the inclination.

10. The rain/snow area detecting device of claim 9, wherein the rain/snow reflection determining module includes a rain/snow determining counter that determines whether the inclination calculated by the inclination calculating module and the change in the inclination satisfy a predetermined condition every time the inclination is calculated by the inclination calculating module, and changes a count value of the rain/snow determining counter based on the determination result; and
    the rain/snow reflection determining module determines whether the received signals are the reflection signals from at least one of rain and snow based on the count value of the rain/snow determining counter.

11. The rain/snow area detecting device claim 8, wherein the inclination calculating module extracts, from the received signals, received signals that continue in an antenna rotating direction substantially at the same distance, and calculates the inclination based on the extracted received signals.

12. The rain/snow area detecting device of claim 8, wherein the inclination calculating module uses low-pass filtered received signals.

13. A method of detecting a rain/snow area, comprising:
    acquiring received signals detected by a radar;
    calculating an inclination of magnitude of the received signals that continue in a predetermined direction, the inclination being a rate of change in the received signal magnitude per predetermined range in the predetermined direction; and
    determining whether the received signals are reflection signals from at least one of rain and snow by using the calculated inclination.

\* \* \* \* \*